United States Patent [19]
Suzuki et al.

[11] Patent Number: 5,592,448
[45] Date of Patent: Jan. 7, 1997

[54] ACCESS CONTROL APPARATUS FOR OPTICAL DISK ACCORDING CHANGE OF TRACK PITCH

[75] Inventors: Motoyuki Suzuki; Yoshio Suzuki, both of Yokohama, Japan

[73] Assignee: Hitachi, Ltd., Tokyo, Japan

[21] Appl. No.: 495,810

[22] Filed: Jun. 15, 1995

Related U.S. Application Data

[63] Continuation of Ser. No. 49,808, Apr. 20, 1993, abandoned.

[30] Foreign Application Priority Data

May 8, 1992 [JP] Japan ..................... 4-116315

[51] Int. Cl.$^6$ ............................................. G11B 7/085
[52] U.S. Cl. ..................... 369/44.28; 369/44.29; 369/58
[58] Field of Search ................ 369/44.25–44.29, 369/44.35–44.36, 54, 58

[56] References Cited

U.S. PATENT DOCUMENTS

| | | | |
|---|---|---|---|
| 4,773,052 | 9/1988 | Sugiura et al. | 369/44.29 X |
| 5,023,854 | 6/1991 | Satoh et al. | 369/44.29 X |
| 5,065,383 | 11/1991 | Tateishi et al. | 369/44.28 |
| 5,235,583 | 8/1993 | Jongenelis et al. | 369/44.29 X |

FOREIGN PATENT DOCUMENTS 62-231430 10/1987 Japan.

OTHER PUBLICATIONS

Nikkei Electronics, Apr. 18, 1988, pp. 211–224. (Japanese).

*Primary Examiner*—W. R. Young
*Attorney, Agent, or Firm*—Fay, Sharpe, Beall, Fagan, Minnich & McKee

[57] ABSTRACT

An access control apparatus, with which a certain tracking and a stable accessing operation are possible even if a track density changes, wherein a track pitch discriminator to determine a difference in track density, that is a track pitch, is provided, detecting characteristics of a tracking error generator and a velocity detector, and a relationship between a counting value in a track counting circuit and an output from a reference velocity generator are changed in accordance with a result of the determination on the difference in track density, a tracking error signal corresponding to a dislocation of a light spot on an optical disk is obtained even if the track pitch changes, a relative speed of a positioner to the track is determined exactly, and an instructed speed corresponding to a distance to an objective track is settled.

12 Claims, 10 Drawing Sheets

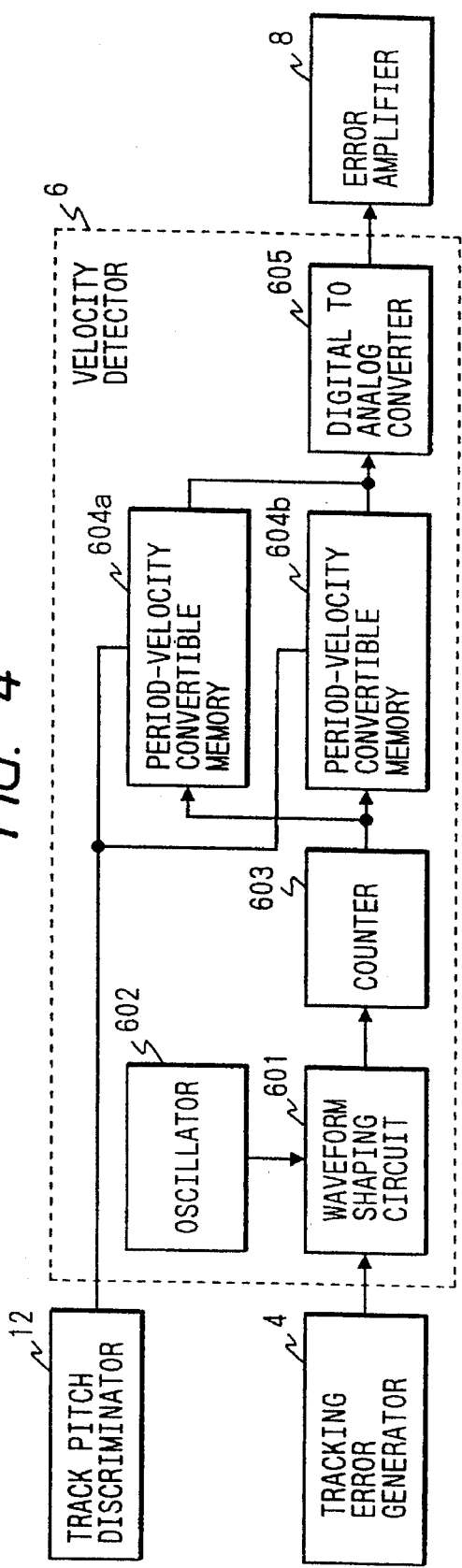
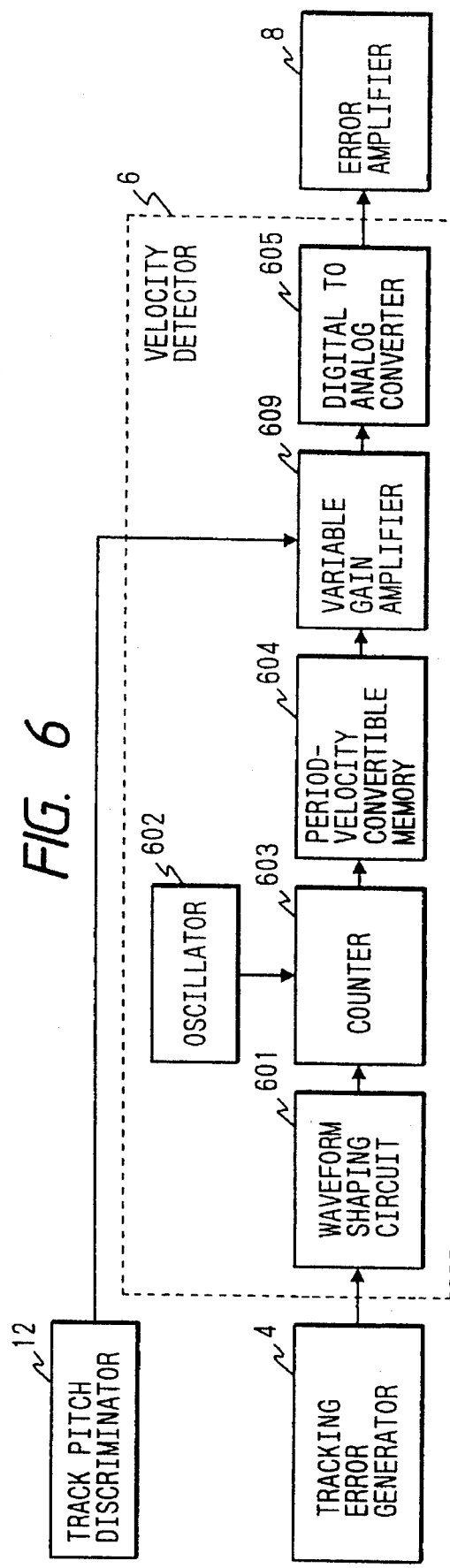

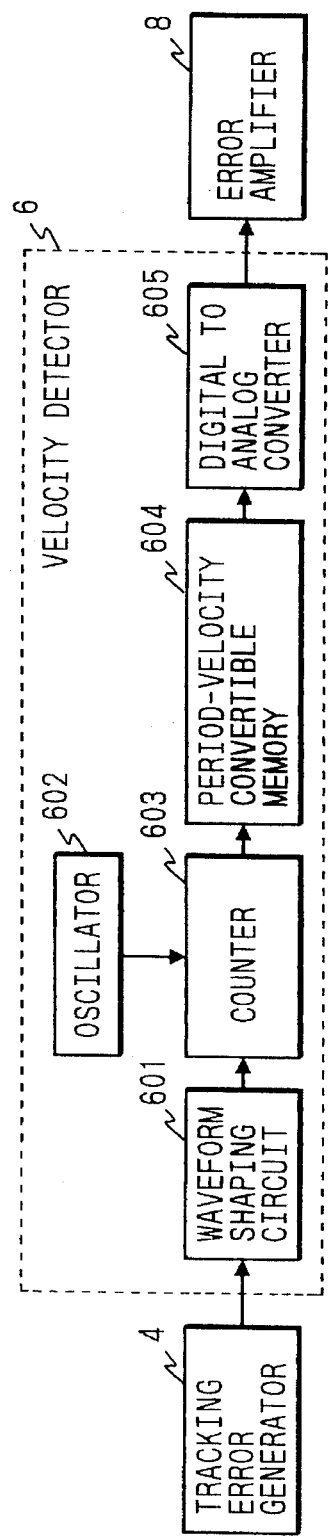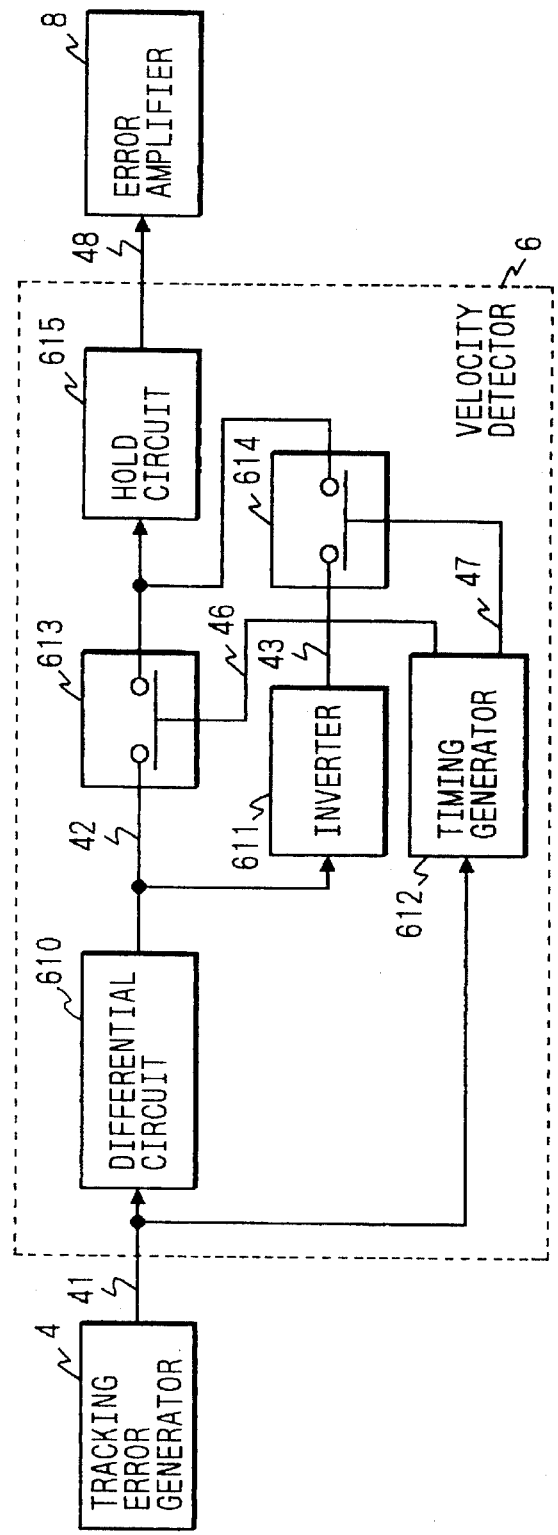

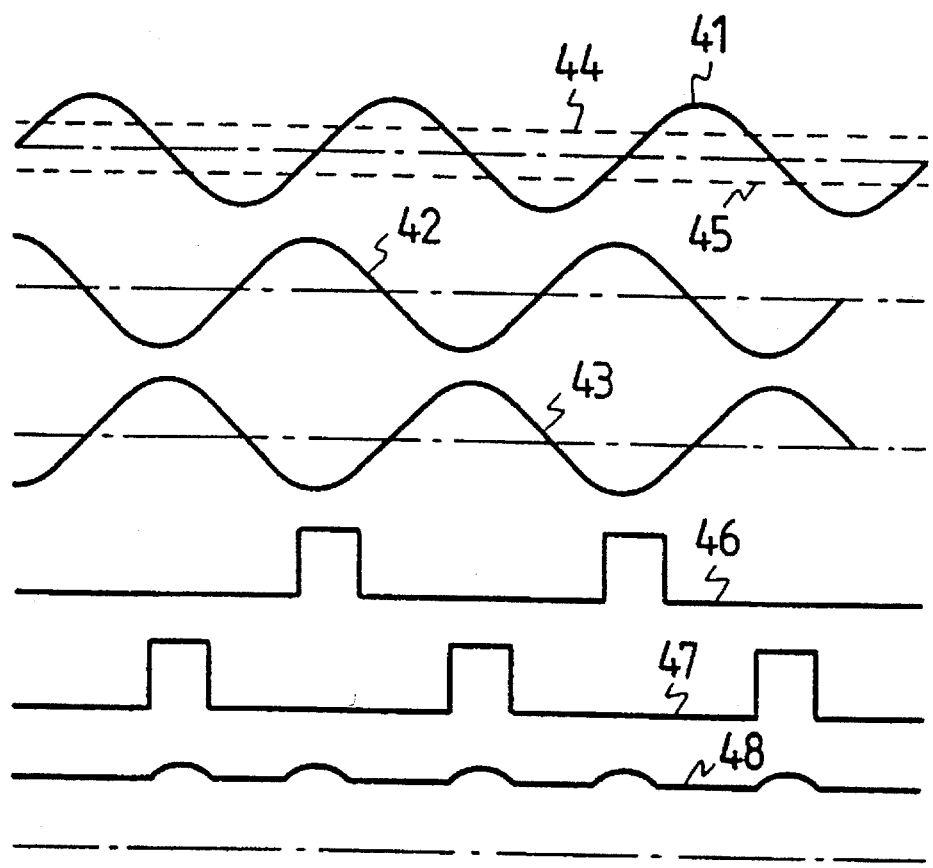

ACCESS CONTROL APPARATUS FOR OPTICAL DISK ACCORDING CHANGE OF TRACK PITCH

This is a continuation of U.S. application Ser. No. 08/049,808 filed Apr. 20, 1993, now abandoned.

BACKGROUND OF THE INVENTION

1. Field of the Invention

The present invention relates to an optical disk apparatus for performing record/regeneration optically, especially, to an access control apparatus for an optical disk, which can be responsible for a case even if a track pitch in the optical disk changes.

2. Description of the Prior Art

Currently, with recent advancement in laser technology, an optical disk apparatus having a high density, a large capacity, and a possibility of random accessing becomes noteworthy, and apparatus relating to this field have been progressed.

As for an access apparatus in the field of optical disk apparatus, the apparatus shown in FIG. 10 is disclosed in JP-A-62-231430 (1987) or in Nikkei Electronics (Apr. 18, 1988, pages 211–224).

Referring to FIG. 10, an optical disk 1 is driven by a spindle motor 2 and rotates so as to pursue a desired information track by being tracked in a radius direction of the optical disk with an optical head which is mounted on a positioner 3. The optical head performs recording and regeneration of information by projecting a light spot on the information track which is provided on the optical disk 1. An output from the positioner 3 is taken into a tracking error generator 4 which generates a tracking error signal corresponding to an amount of relative displacement of the track and the light spot on the optical disk 1, and an output from the tracking error generator 4 is taken into a following servo circuit 5, a velocity detector 6, and a track counting circuit 10.

The following servo circuit 5 supplies an output back to the positioner 3 so as to make the light spot pursue the desired information track corresponding to the tracking error signal from the tracking error generator 4, and accordingly, a tracking control loop is composed. The velocity detector 6 detects a relative velocity of the positioner 3 to information track in accordance with the tracking error signal. The track counting circuit 10 is supplied a number of tracks to run from an input device 11 when the optical head must access to a desired information track, and subtracts one from the number of the tracks to run at each time the light spot crosses over one track, and generates a timing signal at a best position where the optical head must touch on the desired information track at the time when the number of tracks to run becomes zero. The timing signal generated by the track counting circuit 10 is taken into a reference velocity generator 7 and a selector 9. The reference velocity generator 7 gives a relative velocity to the tracks of the positioner 3 in correspondence with the number of tracks to run to the desired objective track, the outputs from the reference velocity generator 7 and the velocity detector 6 are taken into an error amplifier 8, the error amplifier 8 amplifies an error between the output from the reference velocity generator 7 and the output from the velocity detector 6, and returns the amplified error to the positioner 3. Owing to the returning of the output from the error amplifier 8 to the positioner 3, a velocity control loop is composed. The selector 9 selects either of two loops, a tracking control loop and a velocity control loop, in accordance with the timing signal from the track counting circuit 10.

FIG. 11 is a block diagram showing a concrete composition of the tracking error Generator 4 by a prior art, which is composed of photoelectric converters 401a, 401b, current-voltage converters, 402a, 402b, and an error amplifier 403. The photoelectric converters, 401a, 402b, receive reflected lights from the optical disk 1 at the light spot and convert the lights to electric currents, and the electric currents as outputs from the photoelectric converters, 401a, 402b, are converted to voltage signals by the current-voltage converters, 402a, 402b. The error amplifier 403 calculates the error between the two outputs from the current-voltage converters 402a, 402b, amplifies the error, and outputs a tracking error signal 41 in correspondence with an amount of dislocation in the position of the light spot on the optical disk 1.

FIG. 12 is a block diagram showing a concrete composition of the reference velocity generator 7 by a prior art. The reference velocity generator 7 is composed of a reference velocity data memory 701 which outputs an instructing value for velocity in correspondence with the number of tracks to go to the objective track shown on a track counter in the track counting circuit 10, and a digital to analog converter 702 for converting digital outputs from the reference velocity data memory 701 to analogous signals. Generally, the instruction from the reference velocity data memory 701 has a value proportional to a square root of a distance to the objective track, and the instruction is prepared so that the velocity on the objective track becomes approximately zero. And, the digital to analog converter 702 converts the outputs from the reference velocity data memory 701 to an velocity instructing signal in correspondence with the number of tracks to go to the objective information track and outputs to the error amplifier 8.

FIG. 13 is a block diagram showing a concrete composition of the velocity detector 6 by a prior art, and an example of the period measuring type velocity detector which detects a relative velocity to tracks of the positioner 3 by measuring a period of crossing over the tracks. Referring to FIG. 13, the velocity detector 6 is composed of a waveform shaping circuit 601, an oscillator 602, a counter 603, a period-velocity convertible memory 604, and a digital to analog converter 605. The wave form shaping circuit 601 generates the tracking error signal from the tracking error generator 4 pulses, the counter counts the output from the oscillator 602 during a period of the pulsed tracking error signal, and the period-velocity convertible memory 604 converts the information indicating the period supplied from the counter into a value proportional to the velocity.

In accordance with the period measuring type velocity detector which is composed in a manner as described above, the counter 603 counts the outputs from the oscillator which oscillates with a designated period during a period of the tracking error signal which is detected by the tracking error generator 4 when the positioner 3 crosses over a track. When the period for crossing over the track is short, that is, when the relative velocity to the track of the positioner 3 is fast, a counted value becomes small, and when the period for crossing over the track is long, that is, when the relative velocity to the track of the positioner 3 is slow, the counted value becomes large. That means, the counted value by the counter 603 is reversely proportional to the velocity. Accordingly, the period-velocity convertible memory 604 is made to supply a value as an output to the digital to analog converter 605 which is reversely proportional to the counted value taken as an input. The digital to analog converter 605 converts the value to a value proportional to the relative velocity to the track of the positioner 3, and outputs to next stages.

FIG. 14 is a block diagram showing another composition of the velocity detector by a prior art, and an example of a differential type velocity detector which detects a relative velocity to the track of the positioner 3 by differentiating the tracking error signal. Referring to FIG. 14, the velocity detector 6 is composed of a differential circuit 610 which differentiates the tracking error signal supplied from the tracking error generator 4 as an output, an invertor 611 which reverses an output from the differential circuit 610, a timing generator 612 which outputs a timing signal for indicating a linear portion in the tracking error signal corresponding to a direction of inclination for the linear region portion of the tracking error signal, switches 613, 614, and a hold circuit 615.

Referring to FIG. 15, operation of the differential type velocity detector is explained.

When the positioner 3 moves with a constant velocity, a tracking error signal 41 which is detected by the tracking error generator 4 prepares differential waveforms 42, 43, with the differential circuit 610 and the invertor 611. On the other hand, the timing generator 612 prepares timing signals 46, 47, based on threshold values 44, 45, which indicate the linear region portion of the tracking error signal, and transmits the timing signal to the switches 613, 614. Each of the switches 613, 614 closes when the timing signal is in a high level, and opens when the timing signal is in a low level. Accordingly, the switch 613 transmits only the vicinity of a positive peak in the differential waveform 42 to a subsequent step by the timing signal 46, and the switch 614 transmits only the vicinity of a positive peak in the differential waveform 43 to a subsequent step by the timing signal 47. Consequently, if a frequency of the tracking error signal is constant, the hold circuit 615 outputs a nearly linear value 48. The above described output 48 takes a large value when the frequency of the tracking error signal is high and a small value when the frequency of the tracking error signal is low because the output is prepared by a differential operation. That means, the above described output 48 indicates a value proportional to a relative velocity to the track of the positioner 3.

Currently, regarding to an optical disk apparatus, improvements of a linear recording density and a track density for increasing a memory capacity of a disk by adoption of a laser having a shorter wave length than the length in a practical use at present is under consideration. However, changing of a track pitch causes a change of detective sensitivity of the tracking error generator which detects a relative difference in positions of the track and the light spot. And, if the track density and the track pitch change, the detective sensitivity of the above described velocity detector must be also changed because the velocity detector detects a relative velocity of the positioner to the track based on the tracking error signal. Furthermore, the reference velocity generator instructs a relative velocity of the positioner to the optical disk in correspondence with a value of the track counter in the counter which indicates a number of remaining tracks to go to the objective track. Therefore, if the track density changes, a relationship between the value of the track counter and a distance to the objective track changes, and accordingly, an instruction for velocity in correspondence with the distance to the objective track is also changed.

As above explained, when a disk having a large track density is used in an access control apparatus corresponding to a disk having a conventional track density, or when a disk having a conventional track density is used in an access control apparatus corresponding to a disk having a large track density, characteristics of the tracking control loop and the velocity control loop are changed, and consequently, such a problem as the loops become unstable is caused. That means, a problem that an interchangeability between the disk having a conventional track density and the disk having a larger track density than that of the conventional one can not be realized.

SUMMARY OF THE INVENTION

(1) Objects of the Invention

The present invention is achieved in relation to the above described problem in the prior art, and one of the objects of the present invention is to provide an access control apparatus for optical disks which pursues certainly even in a case that the track density changes and can maintain a stable access operation.

(2) Methods of Solving the Problems

In order to achieve the above object, an access control apparatus relating to the present invention comprises a tracking control loop which is composed of a positioner comprising an optical head for recording or regenerating information by forming a light spot on a information track provided on an optical recording medium, wherein the optical head is moved in a radius direction of an optical disk for positioning on a desired information track, a tracking error generator to prepare a tracking error signal indicating a relative positions of the information track and the light spot from a signal supplied from the optical head, and a following servo circuit which supplies an output from the tracking error generator back to the positioner in order to make the optical head pursue the desired information track in correspondence with the tracking error signal, a velocity control loop which is composed of a means for track counting wherein a number of tracks to go to an objective information track is supplied from an input device when an access to the desired information track from the information track which is being pursued at that time becomes necessary and the number of the tracks is subtracted by one per each crossing over the information track, a reference velocity generator which outputs a reference velocity with changing in correspondence with the values from the counter, a velocity detector which detects a relative velocity of the optical head to the information track based on a tracking error signal, and an error amplifier which amplifies an error between the reference velocity generator and the velocity detector, and supplies the amplified error back to the positioner, and a selector for the control loops which accomplishes the access to the desired information track by changing the velocity control loop to the tracking control loop in the vicinity of the desired information track, wherein a track pitch discriminator which determines the track pitch of the disk is provided so as to change detecting characteristics of the tracking error generator and the velocity detector, and a relationship between the values in the track counting circuit and the output from the reference velocity generator. That is, the tracking error generator is composed of a variable gain amplifier so as to select amplifying degrees of the variable gain amplifier. The period measuring type velocity detector is composed so as to change a frequency of the oscillator, a period-velocity convertible memory in the period-velocity convertor, and an amplifying degree of the variable gain amplifier. The differential type velocity detector is composed so as to select amplifying degrees of the variable gain amplifier. The reference velocity generator is composed so as to select the reference velocity data memory.

In accordance with the tracking error generator in the above described composition, the tracking error signal, Ve, can be approximately expressed by a sine wave having a period of the track pitch, P.

$$Ve = Te \cdot \sin(2\pi X/P)$$

where, X is a dislocation of the light spot from the center of the track, and Te is an amplitude of the error signal. An error detecting sensitivity Ae for the dislocation of the light spot from the center of the track is expressed by the following equation, because the tracking control loop operates in the vicinity of zero in the error signal level.

$$Ae = Te \cdot 2\pi/P$$

Accordingly, it is revealed that the error detecting sensitivity Ae changes depending on the track pitch, P.

Therefore, with providing the variable gain amplifier, and by putting X for the dislocation of the light spot from the center of the track, A1 for an amplification degree of the amplifier for the track pitch P1, V1 for an output from the amplifier, A2 for an amplification degree of the amplifier for the track pitch P2, and V2 for an output from the amplifier, V1 and V2 are expressed by the following equations:

$$V1 = A1 \cdot Te \cdot 2\pi \cdot X/P1$$

$$V2 = A2 \cdot Te \cdot 2\pi \cdot X/P2$$

Then, if the amplification degree is chosen so that A1/P1 becomes equal to A2/P2, V1 becomes equal to V2. Accordingly, by selecting an adequate amplification degree corresponding to the track pitch, the output from the amplifier corresponds to the dislocation X of the light spot from the center of the track by one to one relationship, and the location can be detected with regardless of the track pitch.

With the period measuring type velocity detector, by putting v for a relative velocity to the track of the positioner, F1 for an oscillating frequency of a oscillator at the track pitch P1, N1 for a counted value of the counter, F2 for an oscillating frequency of the oscillator at the track pitch P2, N2 for a counted value by the counter, the N1 and N2 are expressed by the following equations:

$$N1 = (P1/v) \cdot F1$$

$$N2 = (P2/v) \cdot F2$$

Then, if a frequency of an output from the oscillator is chosen so that P1·F1 becomes equal to P2·F2, N1 becomes equal to N2. Accordingly, by selecting an adequate oscillating frequency of the output from the oscillator, the counted value by the counter corresponds to the relative velocity by an one to one relationship, and the velocity can be detected with regardless of the track pitch. Furthermore, with the period measuring type velocity detector, the counted value by the counter has a relationship in reversely proportional to the velocity, and the relationship can be expressed by the following equation:

$$C = N \cdot M$$

where, N is the counted value by the counter, M is an output from the period-velocity convertible memory, and C is a period-velocity conversion constant.

When putting v for a relative velocity to the track of the positioner, F for an oscillating frequency of the oscillator, C1 for a period-velocity conversion constant and M1 for an output from the period-velocity convertible memory at the track pitch P1, and C2 for a period-velocity conversion constant and M2 for an output from the period-velocity convertible memory at the track pitch P2, the M1 and M2 are expressed by the following equations:

$$M1 = C1/(P1 \cdot F/v)$$

$$M2 = C2/(P2 \cdot F/v)$$

Then, if a period-velocity conversion constant is chosen so that C1/P1 becomes equal to C2/P2, M1 becomes equal to M2. Accordingly, by selecting a period-velocity convertible memory having an adequate period-velocity conversion constant, the output from the period-velocity convertible memory corresponds to the relative velocity v by an one to one relationship, and the velocity can be detected with regardless of the track pitch. Furthermore, with the period measuring type velocity detector, the output V from the digital to analog converter corresponding to the output M from the period-velocity convertible memory is given by the following equation:

$$V = A \cdot M$$

where, A is a D/A conversion constant.

When, with providing a variable gain amplifier, putting v for a relative velocity to the disk of the positioner, F for an oscillating frequency of the oscillator, , and C is a period-velocity conversion constant, A1 for an amplification degree of the amplifier and V1 for an output of the amplifier at the track pitch P1, and A2 for an amplification degree of the amplifier and V2 for an output of the amplifier at the track pitch P2, the V1 and V2 are expressed by the following equations:

$$V1 = A1 \cdot A \cdot C/(P1 \cdot F/v)$$

$$V2 = A2 \cdot A \cdot C/(P2 \cdot F/v)$$

Then, if a magnification degree is chosen so that A1/P1 becomes equal to A2/P2, V1 becomes equal to V2. Accordingly, by selecting an adequate magnification degree corresponding to the track pitch, the output from the amplifier corresponds to the relative velocity v by an one to one relationship, and the velocity can be detected with regardless of the track pitch.

Next, a differential type velocity detector is explained hereinafter.

The tracking error signal Ve can be approximately expressed with a sine waveform having a period equal to the track pitch P as shown by the following equation.

$$Ve = Te \cdot \sin(2\pi X/P)$$

where, X is a dislocation of the light spot from the center of the track, and Ae is an amplitude of the error signal. If the positioner moves with a relative velocity v to the disk, X is expressed by the following equation:

$$X = v \cdot t$$

Accordingly, when the positioner moves with a relative velocity v to the disk, the error signal Ve can be expressed by the following equation:

$$Ve = Te \cdot \sin(2\pi \cdot v \cdot t/P)$$

Differentiation of the error signal with the time t is expressed by the following equation:

$$dVe/dt = Te \cdot 2\pi \cdot v \cdot \cos(2\pi \cdot v \cdot t/P)/P$$

The differential type velocity detector uses a differential value of the error signal in the vicinity of the peak as a velocity signal. Therefore, the velocity signal vd is expressed by the following equation:

$$vd = Te \cdot 2\pi \cdot v/P$$

In accordance with the above equation, it is revealed that the velocity signal proportional to the relative velocity can be obtained, and that the velocity signal depends on the track pitch P. Then, with providing a variable gain amplifier, putting v for a relative velocity to the disk of the positioner, A1 for an amplification degree of the amplifier and V1 for an output of the amplifier at the track pitch P1, A2 for an amplification degree of the amplifier and V2 for an output of the amplifier at the track pitch P2, the V1 and V2 are expressed by the following equations:

$$V1 = A1 \cdot Te \cdot 2\pi \cdot v/P1$$

$$V2 = A2 \cdot Te \cdot 2\pi \cdot v/P2$$

Then, if a magnification degree is chosen so that A1/P1 becomes equal to A2/P2, V1 becomes equal to V2. Accordingly, by selecting an adequate magnification degree corresponding to the track pitch, the output from the amplifier corresponds to the relative velocity v by an one to one relationship, and the velocity can be detected with regardless of the track pitch.

Next, the reference velocity generator is explained.

The reference velocity generator instructs a relative velocity to an optical disk of the positioner in correspondence with a value of the track counter in the track counting circuit which indicates a number of tracks to go to an objective track, that is, a distance to the objective track.

By putting X for the distance to the objective track, N1 for a value of the track counter, M1 for an output from the reference velocity data memory, f1 for a function which indicates a relationship between the values of the track counter N1 and the output M1 of the reference velocity data memory at the track pitch P1, and N2 for a value of the track counter, M2 for an output from the reference velocity data memory, f2 for a function which indicates a relationship between the values of the track counter N2 and the output M2 of the reference velocity data memory at the track pitch P2, the M1 and M2 are expressed by the following equations:

$$M1 = f1(N1)$$

$$M2 = f2(N2)$$

where, $$X = N1 \cdot P1 = N2 \cdot P2$$

In order to make the outputs from the reference velocity data memory equal, that means M1 equals to M2, it is necessary to satisfy the following equation:

$$f2(N2) = f1(N2 \cdot P2/P1)$$

Accordingly, by deciding the functions f1 and f2 so as to satisfy the above equation and selecting functions corresponding to the track pitch, that is, data from the reference velocity data memory, a reference velocity in correspondence with the distance to the objective track can be obtained with regardless of the track pitch.

BRIEF DESCRIPTION OF THE DRAWINGS

FIG. 4 is a block diagram indicating the second embodiment of the velocity detector, FIG. 6 is a block diagram indicating the fourth embodiment of the velocity detector, FIG. 13 is a block diagram indicating a period measuring type velocity detector of the prior art, FIG. 14 is a block diagram indicating a differential type velocity detector of the prior art, FIG. 15 is an schematic illustration indicating operational waveforms of the differential type velocity detector shown in FIG. 14.

DETAILED DESCRIPTION OF THE EMBODIMENTS

Figure 1:
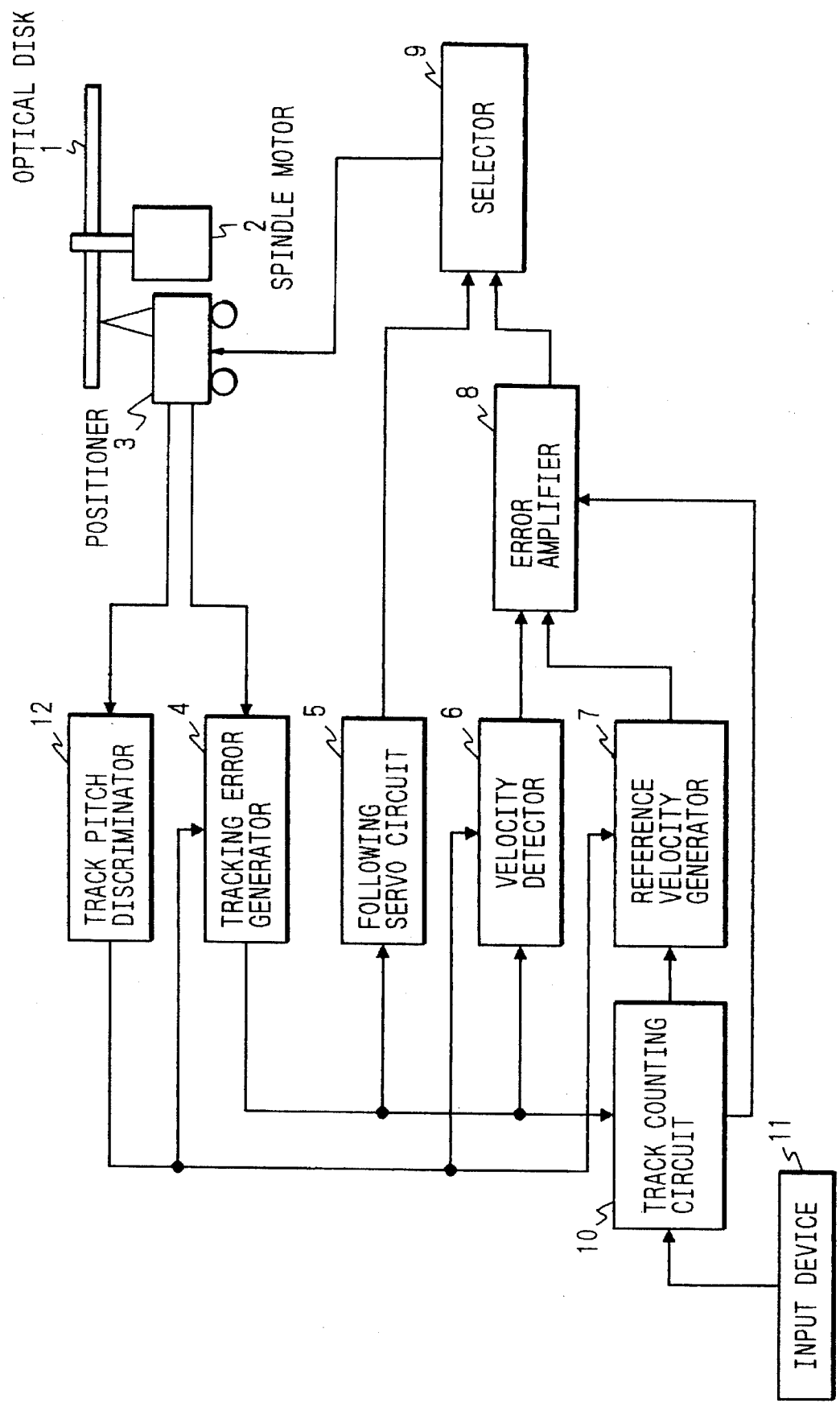
FIG. 1 is a block diagram indicating an embodiment of the access control apparatus related to the present invention.

Referring to the drawings, the embodiments of the present invention are explained hereinafter.

FIG. 1 is a block diagram indicating an access control apparatus related to the present invention. In the following explanation, a member having the same function as the member in the prior art is given with a same numeral mark and a duplicated explanation is omitted as possible if the explanation is not specifically necessary.

Figure 10:
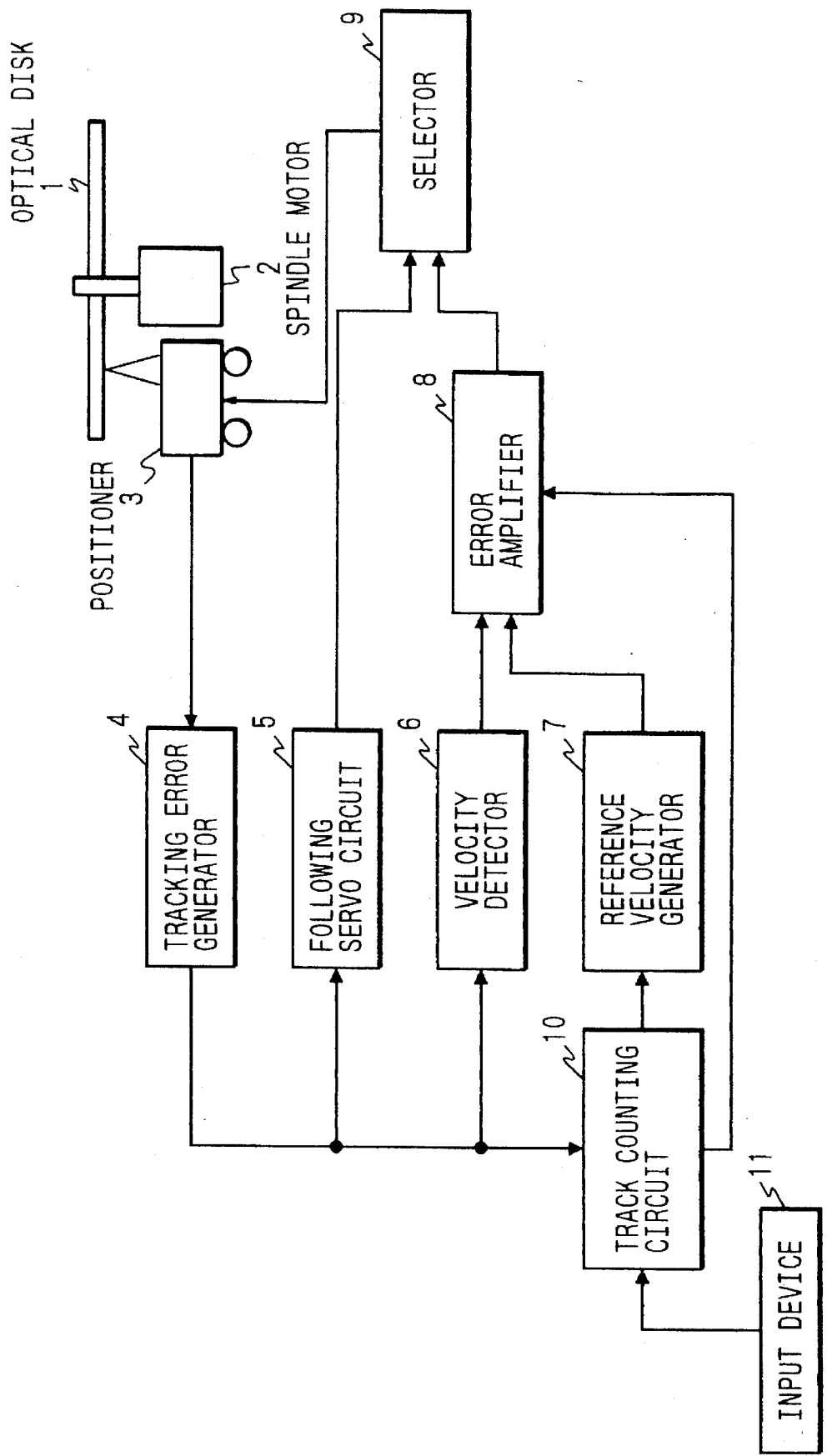
FIG. 10 is a block diagram indicating an access control apparatus of the prior art.

Referring to FIG. 1, an output from the positioner 3 is taken into the tracking error generator 4 and the track pitch discriminator 12, and an output from the track pitch discriminator 12 is taken into the tracking error generator 4, the velocity detector 6, and the reference velocity generator 7, respectively. As for a method for determining track pitch in the track pitch discriminator 12, an example method wherein the track pitch is determined by a PEP (Phase-Encoded Part of the control tracks) region which is provided in the ISO (International Organization for Standard) standard on an optical disk of 130 mm or an optical disk of 90 mm is well known. In accordance with the above method, information on format and the others of the disk is previously recorded in the PEP region, but information on the track pitch is previously recorded separately from the above information, and the information on the track pitch is read out at the regeneration of the disk in order to make it possible to determine the track pitch. The other members which are not specifically explained are composed of as same as the prior art shown in FIG. 10.

Figure 2:
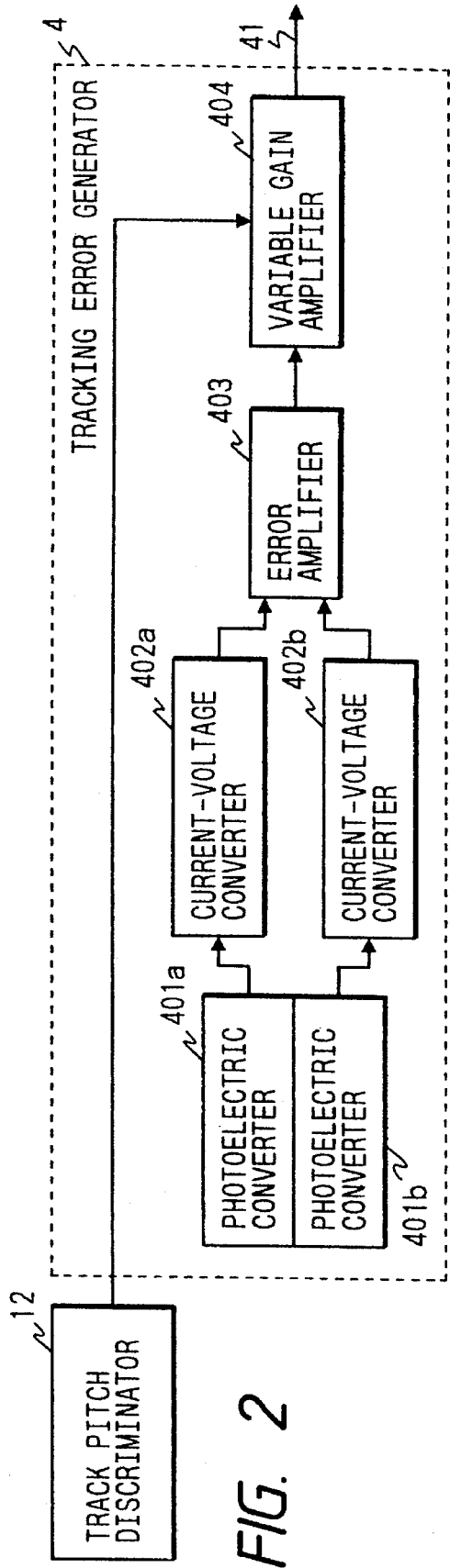
FIG. 2 is a block diagram indicating an embodiment of the tracking error generator related to the present invention.
Figure 11:
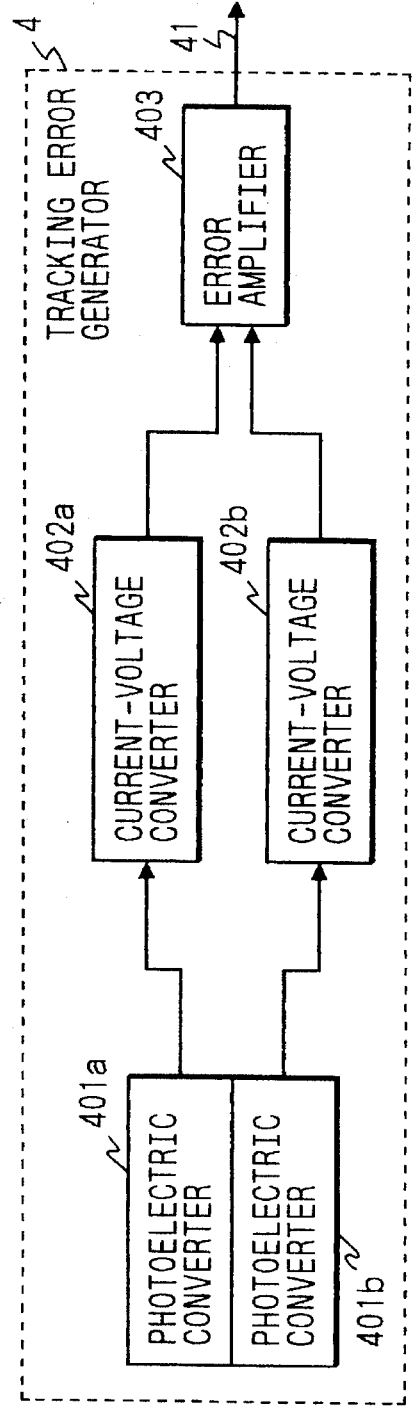
FIG. 11 is a block diagram indicating a tracking error generator of the prior art.

FIG. 2 is a block diagram indicating an embodiment of a tracking error generator. Comparing with the prior art shown in FIG. 11, the present embodiment specifically has the variable gain amplifier 404 at a rear stage of the error amplifier for amplifying an output from the error amplifier 403 corresponding to an output from the track pitch discriminator 12. The variable gain amplifier 404 changes its amplification factor depending on the output from the track pitch discriminator 12 in such a manner as an amplification factor A1 for the track pitch P1 and an amplification factor A2 for the track pitch P2. The amplification factor is settled so as to satisfy a relationship expressed by the following equation:

$$A1/P1 = A2/P2$$

Accordingly, a tracking error signal corresponding to a dislocation of a light spot on an optical disk can be supplied from the variable gain amplifier 404 irrespectively of the track pitch.

Figure 3:
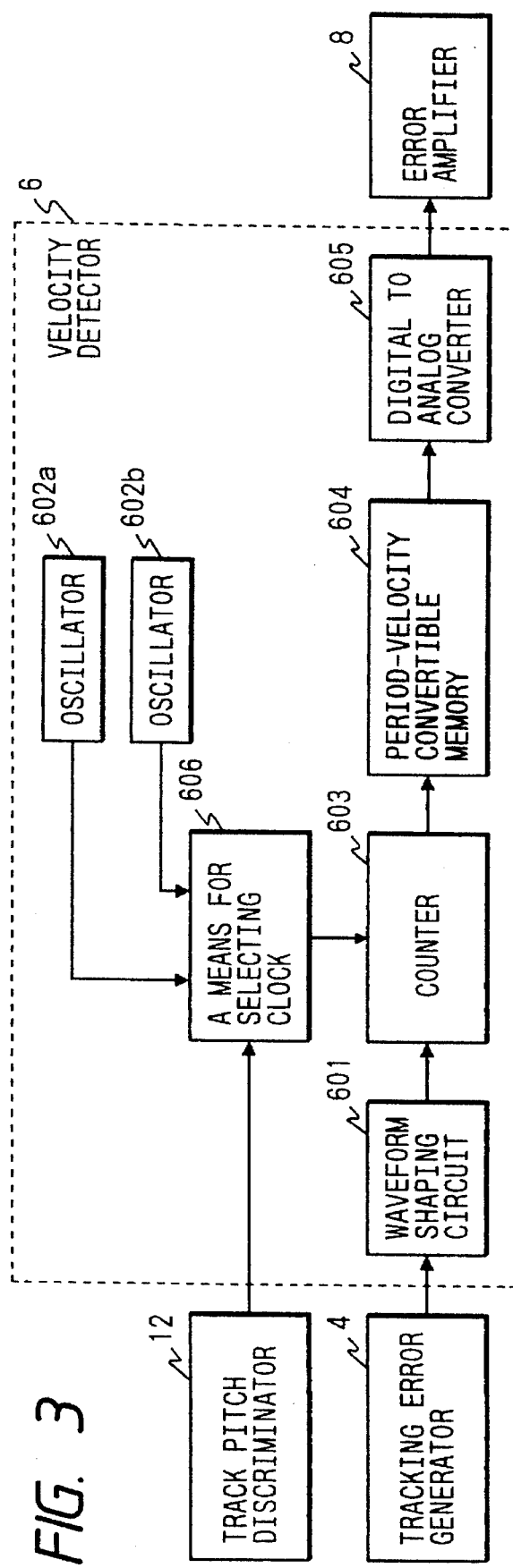
FIG. 3 is a block diagram indicating the first embodiment of the velocity detector.

FIG. 3 is a block diagram showing the first embodiment of the velocity detector 6. The present embodiment is an example of the period measuring type velocity detector. Comparing with the prior art shown in FIG. 13, the embodiment specifically has two oscillators 602a and 602b, and the selector 606 which receives the output from the track pitch discriminator 12 both at a front stage of the counter 603. An oscillating frequency F1 for the oscillator 602a and an oscillating frequency F2 for the oscillator 602b are settled so as to satisfy a relationship expressed by the following equation:

$$P1 \cdot F1 = P2 \cdot F2$$

Depending on an output from the track pitch discriminator 12, the selector 606 selects an output from the oscillator 602a when the track pitch is P1 and an output from the oscillator 602b when the track pitch is P2, and supplies the selected output to the counter 603. The period-velocity convertible memory 604 outputs a value reversely proportional to a supplied counted value to the digital to analog converter 605. The digital to analog converter 605 converts the supplied value to a value proportional to a relative velocity of the track to the positioner 3, and outputs the value.

In the above embodiment, two oscillator are provided so as to be selected depending on the track pitch, but a composition is essential wherein the frequency of the signal supplied to the counter 603 can be selective depending on the track pitch.

FIG. 4 is a block diagram showing the second embodiment of the velocity detector 6, and the present embodiment is an example of the period measuring type velocity detector. Comparing with the prior art shown in FIG. 13, the present embodiment has two period-velocity convertible memories 604a, 604b, which are provided in parallel so as to be supplied with an output respectively from the track pitch discriminator, and the oscillator 602 is arranged so that an output from the oscillator 602 can be supplied to the waveform shaping circuit 601. In the above case, each of the period-velocity convertible memories 604a, 604b has a respective period-velocity conversion constant such as C1 for the period-velocity conversion constant of the period-velocity convertible memory 604a when the track pitch is P1, and C2 for the period-velocity conversion constant of the period-velocity convertible memory 604b when the track pitch is P2, and the constants are settled so as to satisfy a relationship expressed by the following equation:

$$C1/P1 = C2/P2$$

When the track pitch discriminator 12 determines the track pitch as P1, the period-velocity convertible memory 604a is selected, and, when the track pitch is P2, the period-velocity convertible memory 604b is selected, and data from the selected period-velocity convertible memory are supplied to the digital to analog converter 605. The digital to analog converter 605 outputs a velocity signal corresponding to a relative velocity to the track and the positioner 3 in accordance with the output from the period-velocity convertible memories, 604a and 604b.

Figure 5:
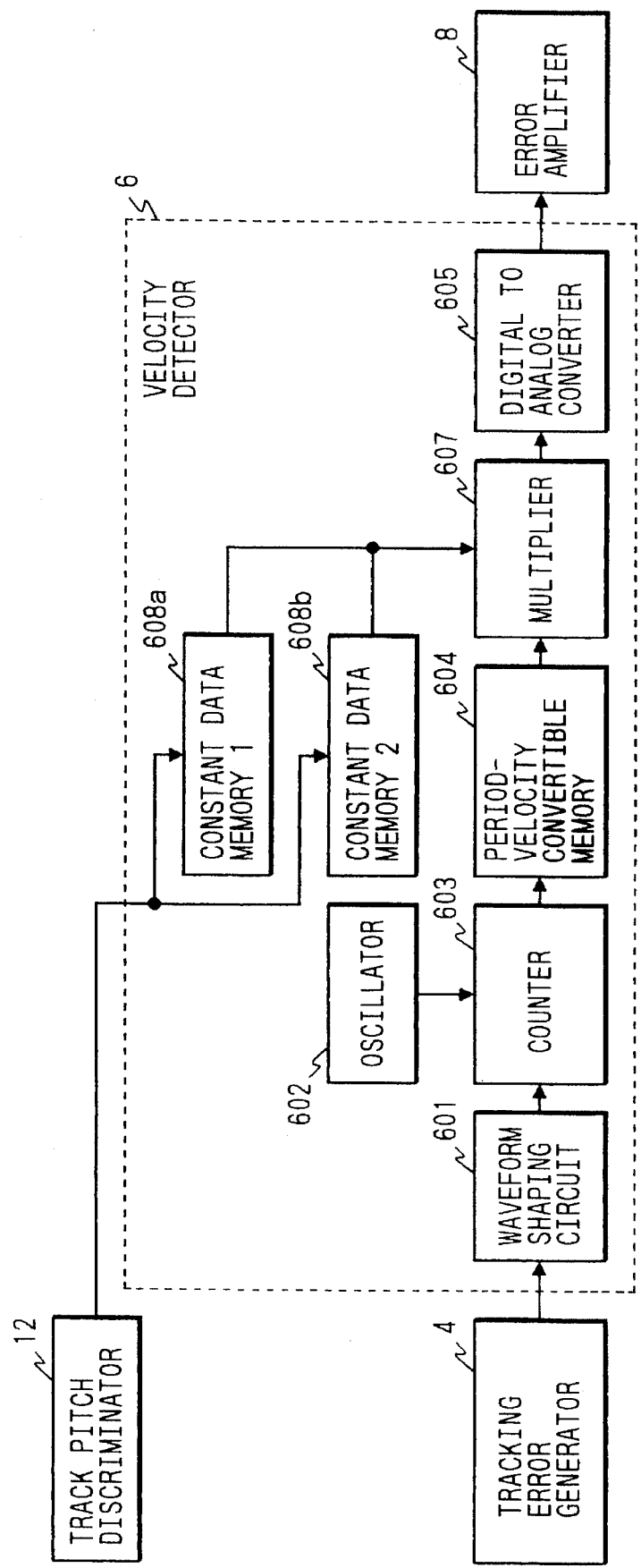
FIG. 5 is a block diagram indicating the third embodiment of the velocity detector.

FIG. 5 is a block diagram showing the third embodiment of the velocity detector 6, and the present embodiment is an example of the period measuring type velocity detector. Comparing with the prior art shown in FIG. 13, the present embodiment has the multiplier 607 at a rear stage of the period-velocity convertible memory 604, and two constant data memories 608a, 608b, which supply respectively one of constant numbers stored previously to the multiplier 607 depending on the output from the track pitch discriminator 12. When putting A1 for the constant number stored in the constant data memory 608a and A2 for the constant data stored in the constant data memory 608b, the A1 and the A2 are settled so as to satisfy a relationship expressed by the following equation:

$$A1/P1 = A2/P2$$

When the track pitch discriminator 12 determines the track pitch as P1, the constant data memory 608a is selected, and, when the track pitch is P2, the constant data memory 608b is selected, and data from the selected constant data memory are supplied to the multiplier 607. The multiplier executes a multiplying calculation of the output from the selected constant data memory and the output from the period-velocity convertible memory 604, and supplies the result to the digital to analog converter 605. The digital to analog converter 605 outputs a signal corresponding to a relative velocity of the positioner 3 to the optical disk 1 in accordance with the output from the multiplier 607. In the above embodiment, the constant number is settled by the memory, but the constant number can be settled by an external members such as a resistor depending on the track pitch irrespectively of the above example.

FIG. 6 is a block diagram showing the fourth embodiment of the velocity detector, and an example of the period measuring type velocity detector. Comparing with the prior art shown in FIG. 13, the present embodiment has the variable gain amplifier 609 at a rear stage of the period-velocity convertible memory 604. The variable gain amplifier 609 amplifies an output from the period-velocity convertible memory 604, and selects an amplification factor in accordance with the output from the track pitch discriminator 12 so that the amplification factor becomes A1 when the track pitch is P1 and A2 when the track pitch is P2. The amplification factor, A1 and A2, are settled so as to satisfy a relationship expressed by the following equation:

$$A1/P1=A2/P2$$

Accordingly, the variable gain amplifier 609 outputs a signal corresponding to a relative velocity of the positioner 3 to the optical disk 1 via the digital to analog converter 605 irrespectively of the track pitch.

Figure 7:
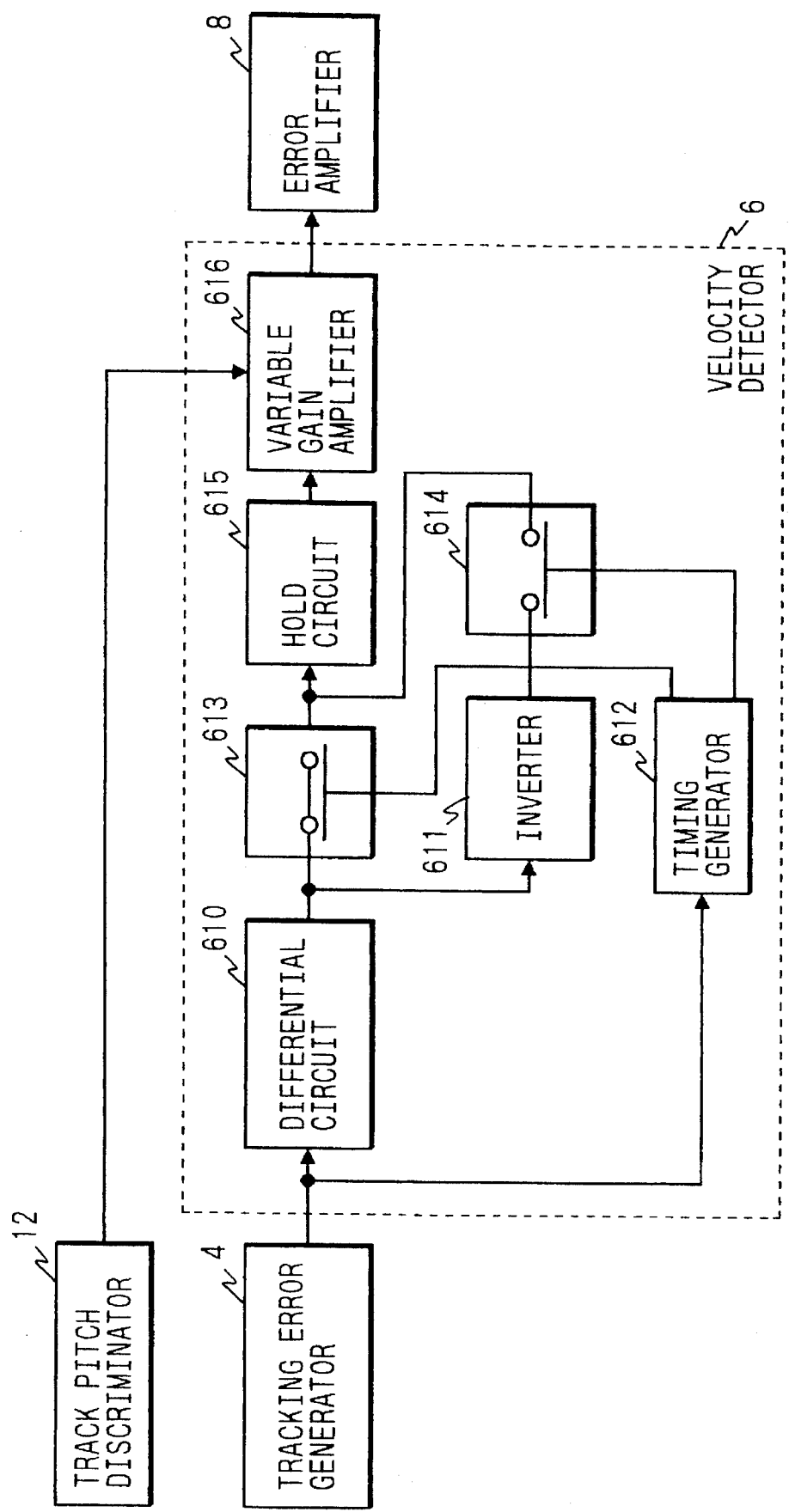
FIG. 7 is a block diagram indicating the fifth embodiment of the velocity detector.

FIG. 7 is a block diagram showing the fifth embodiment of the velocity detector, and the embodiment is an example of the differential type velocity detector. Comparing with the prior art shown in FIG. 14, the present embodiment has the variable gain amplifier 616 which amplifies an output from the hold circuit in accordance with the output from the track pitch discriminator at a rear stage of the hold circuit 615, and the hold circuit 615 selects an amplification factor in accordance with the output from the track pitch discriminator 12 so that the amplification factor becomes A1 when the track pitch is P1 and A2 when the track pitch is P2. The amplification factors, A1 and A2, are settled so as to satisfy a relationship expressed by the following equation:

$$A1/P1=A2/P2$$

Accordingly, the variable gain amplifier 616 outputs a signal corresponding to a relative velocity of the positioner 3 to the optical disk 1 irrespectively of the track pitch. In the present embodiment, the variable gain amplifier 616 is arranged at a rear stage of the hold circuit 615, but the arrangement is not restricted to the manner shown by the present embodiment, and the variable gain amplifier 616 can be arranged at a front stage of the hold circuit 615, a front stage or a rear stage of the differential circuit 610. An essential point of the present embodiment is that the velocity detector is composed so that the amplitude of the signal supplied to the error amplifier 8 can be changed depending on the track pitch.

Figure 8:
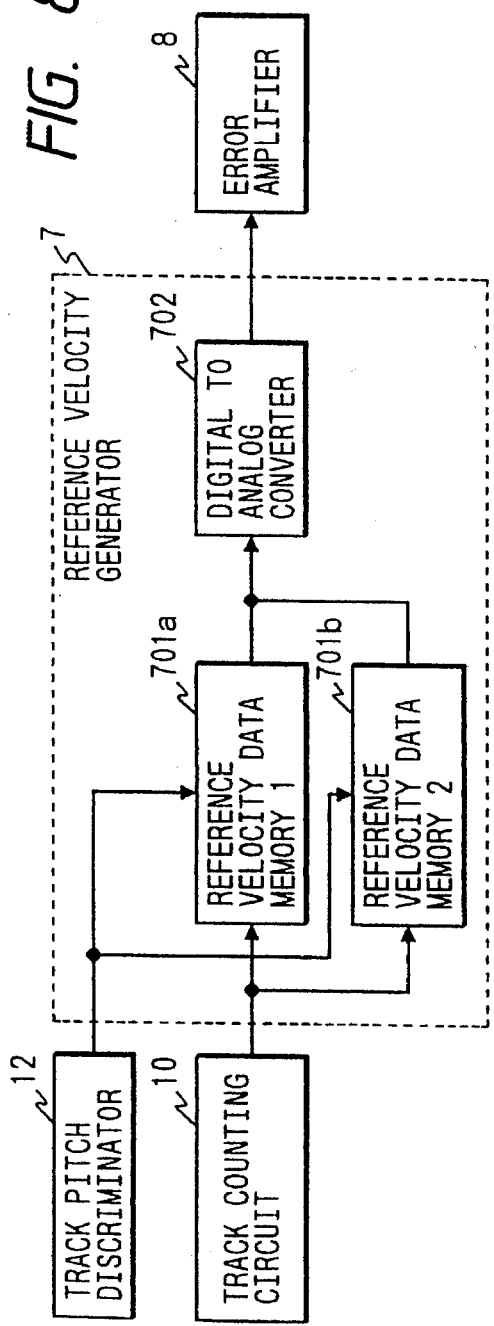
FIG. 8 is a block diagram indicating the first embodiment of the reference velocity generator.
Figure 12:
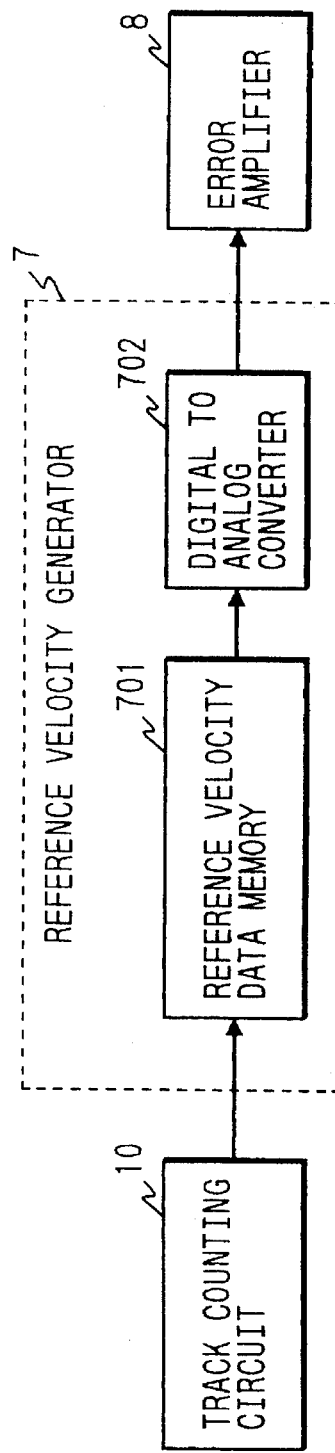
FIG. 12 is a block diagram indicating a reference velocity generator of the prior art.

FIG. 8 is a block diagram showing the first embodiment of the reference velocity generator 7. Comparing with the prior art shown in FIG. 12, the present embodiment specifically has two reference velocity data memories 701a, 701b, arranged in parallel, which settle an objective velocity in accordance with an output from the track pitch discriminator 12.

Putting X for a distance to an objective track from the reference velocity data memory 701, N1 for a value of a counter in the track counting circuit 10 and f1 for a function expressing a relationship between the value of the counter N1 and an output from the reference velocity data memory 701a when the track pitch is P1, N2 for a value of a counter in the track counting circuit 10 and f2 for a function expressing a relationship between the value of the counter N2 and an output from the reference velocity data memory 701b when the track pitch is P2, values of the reference velocity data memories 701a, 701b, are settled so as to satisfy a relationship expressed by the following equation:

$$f2(N2)=f1(N2 \cdot P2/P1)$$

In accordance with the output from the track pitch discriminator 12, the reference velocity data memory 701a is selected when the track pitch is P1, the reference velocity data memory 701b is selected when the track pitch is P2, and an output from the selected reference velocity data memory is supplied to the A/D converter 702. The A/D converter 702 supplies an instructed velocity to the error amplifier 8 corresponding to the distance to the objective track in accordance with the output from the reference velocity data memory.

Figure 9:
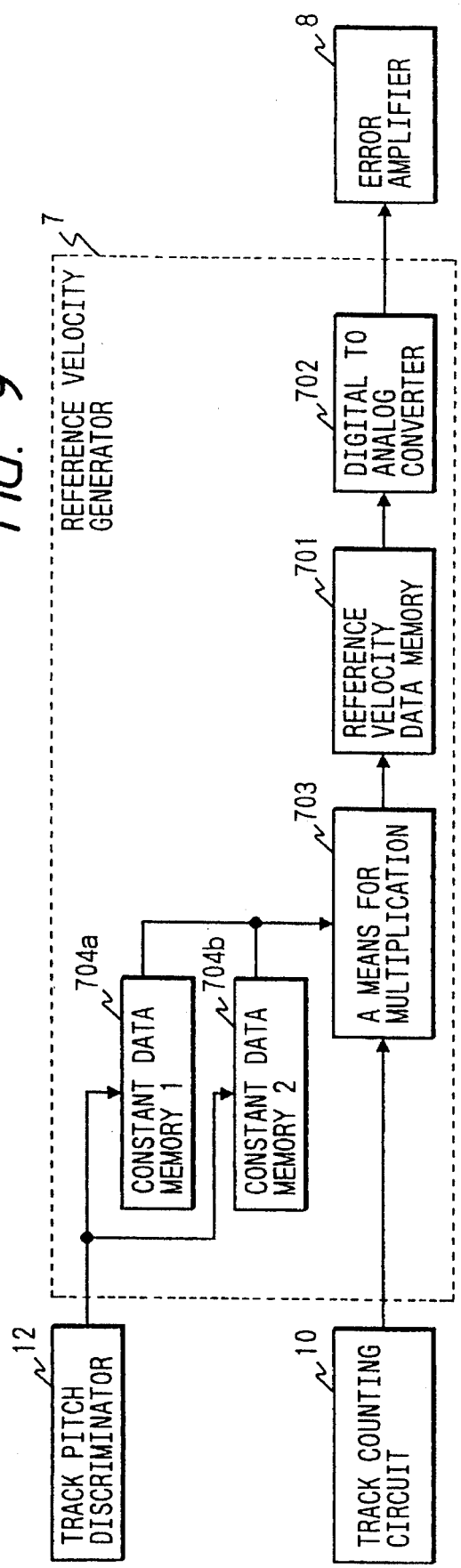
FIG. 9 is a block diagram indicating the second embodiment of the reference velocity generator.

FIG. 9 is a block diagram showing the second embodiment of the reference velocity generator 7. Comparing with the prior art showing in FIG. 12, the present embodiment specifically has the multiplier 703 at a front stage of the reference velocity data memory 701, and two constant data memories 704a, 704b, connected to the multiplier 703, for supplying a stored constant number selectively depending on the output from the track pitch discriminator 12.

Putting A1 for a value stored in the constant data memory 704a, and A2 for a number stored in the constant data memory 704b, the values are settled so as to satisfy a relationship expressed by the following equation:

$$A1/P1=A2/P2$$

In accordance with the output from the track pitch discriminator 12, the constant data memory 704a is selected when the track pitch is P1, the constant data memory 704b is selected when the track pitch is P2, and data from the selected constant data memory is supplied to the multiplier 703. The multiplier 703 executes multiplication of the output from the selected constant data memory by the value in the counter of the track counting circuit 10, and supplies the result of the calculation to the reference velocity data memory 701. The A/D converter 702 supplies an instructed velocity to the error amplifier 8 corresponding to the distance to the objective track in accordance with the output from the reference velocity data memory 701. In the present embodiment, the constant number is settled by the memory. However, the constant number may be settled by an external members such as a resister corresponding to the track pitch irrespective of the present embodiment.

In the above described embodiments, the cases having two track pitches, P1 and P2, were explained. However, the present invention is applicable to cases having a plurality of track pitches more than two by selecting the tracking error generator, the period measuring type velocity detector, the differential type velocity detector, and the reference velocity generator in accordance with the number of the track pitches.

Furthermore, in the above described embodiments, the cases were explained wherein a distance from a positioner to an objective track is determined by counting numbers of the track. However, when the distance is determined by an external detector such as a sensor, the same operation as described above can be achieved by selecting a tracking error generator 4 and a velocity detector 6 in accordance with the track pitch.

When the tracking error generator 4 in the embodiment shown in FIG. 2 is used as the tracking error generator in the embodiment shown in FIG. 7, an amplifying degree of the variable gain amplifier 404 is selected by the tracking error generator 4 in accordance with the track pitch, and accordingly, it is not necessary to select the amplifying degree of the variable gain amplifier 616 in the differential type velocity detector. Therefore, in the above described case, selecting the tracking error generator 4 and the reference velocity generator 7 in accordance with the track pitch may be sufficient for the operation. Furthermore, when the distance from the positioner to the objective track is determined by an external detector such as a sensor, selecting the tracking error generator 4 in accordance with the track pitch is sufficient for the operation.

The track pitch is determined in the present embodiment by using the PEP region of the disk, but the track pitch can be determined by using an information on the track pitch which is previously recorded at any other portion than the PEP region of the disk irrespective of the present embodiment. Furthermore, the track pitch can be determined by using a groove or a hole for determining track pitch which are previously fabricated on a cartridge storing the disk.

In accordance with the present invention, an access control apparatus comprising a track pitch discriminator which determines track pitch of a disk so that detecting characteristics of a tracking error generator and a velocity detector, and a relationship between a value of a counter and an output from a reference velocity generator are changed corresponding to an output from the track pitch discriminator, is capable of obtaining a tracking error signal corresponding to a dislocation of a light spot on the disk even if the track pitch changes, detecting a relative velocity of a positioner to the track exactly, and setting an instructed velocity corresponding to a distance to an objective track. Accordingly, an optical head can pursue an information track exactly, and a stable access operation becomes possible.

Furthermore, in accordance with the present invention, an apparatus which is so composed that information on the track pitch is previously recorded on an optical disk and the track pitch discriminator determines the track pitch by regenerating the information on the track pitch, the track pitch discriminator determines the track pitch certainly because the track pitch discriminator determines the track pitch by reading out the track pitch from the optical disk, and the same advantage as the above described invention can be obtained.

Still furthermore, in accordance with the present invention, an apparatus which is so composed that information on the track pitch is previously recorded on a cartridge storing an optical disk, the track pitch discriminator can determine the track pitch certainly because the track pitch discriminator determines the track pitch by reading out the track pitch from the cartridge, and the same advantage as the above described invention can be obtained.

What is claimed is:

1. An access control apparatus comprising:
    a tracking control loop which comprises,
        an optical head for recording and regenerating information by forming a light spot on an information track provided on an optical disk,
        a positioner to move said optical head in a radial direction of the optical disk and position set said optical head on a desired information track,
        a position sensing means for making a tracking error signal indicating a relative position between an information track and the light spot in reference to an output signal from said optical head,
        an amplifying means for amplifying the tracking error signal from said position sensing means,
        a tracking control means for returning an output of said position sensing means back to said positioner in such a manner that said optical head pursues a desired track in response to the output of said amplifying means; and
    a track pitch discriminator to determine a track pitch of the information track, wherein
        an amplitude of said amplifying means is changed in such a manner that an amplitude A1 of said amplifying means at a track pitch P1 and an amplitude A2 of said amplifying means at a track pitch P2 becomes A1/P1=A2/P2 in response to an output of said track pitch discriminator.

2. An access control apparatus as claimed in claim 1, wherein,
    information on the track pitch is previously recorded in a cartridge storing said optical disk, and said track pitch discriminator is so composed that the track pitch is determined by regenerating said information on the track pitch.

3. An access control apparatus comprising:
    a tracking control loop which comprises,
        an optical head for recording and regenerating information by forming a light spot on an information track provided on an optical disk,
        a positioner to move said optical head in a radial direction of the optical disk and position set said optical head on a desired information track,
        a position sensing means for making a tracking error signal indicting a relative position between an information track and the light spot in reference to an output signal from said optical head, and
        a tracking control means for returning an output of said position sensing means back to said positioner in such a manner that said optical head pursues a desired track in response to the tracking error signal;
    a speed control loop which comprises,
        a track count means for setting the number of tracks from the information track being pursued at present by the optical head to a desired information track and reducing the value every time the optical head traverses the information track,
        a reference velocity generating means for outputting a reference velocity while the reference velocity is being changed in response to a value of the track count means,
        a clock generating means for generating a reference clock for use in measuring a period in which a light spot traverses the information track,
        a period count means for measuring a period in which the light spot traverses in response to an output of the clock generating means,
        a period/velocity converting means for outputting a velocity signal corresponding to a velocity in which the light spot traverses the information track in response to an output of the period count means,
        a velocity error sensing means for calculating a difference between said reference velocity generating means and the period/velocity converging means and returning it back to the positioner, and
    a track pitch discriminator to determine a track pitch of the information track, wherein
        an access is carried out for a desired information track by switching from said speed control loop to said tracking control loop at a time the light spot reaches near the desired information track, and a frequency of said clock generating means is changed in such a manner that a frequency F1 of output of said clock generating means at a track pitch P1 and a frequency F2 of an output of said clock generating means at a track pitch P2 shows a relation of P1F1=P2F2 in response to an output of said track pitch discriminator.

4. An access control apparatus as claimed in claim 3, wherein, information on the track pitch is previously recorded in a cartridge storing said optical disk, and said track pitch discriminator is so composed that the track pitch is determined by regenerating said information on the track pitch.

5. An access control apparatus comprising:

a tracking control loop which comprises,
   an optical head for recording or regenerating information by forming a light spot on an information track provided on an optical disk,
   a positioner to move said optical-head in a radial direction of the optical disk and position set said optical head on a desired information track,
   a position sensing means for making a tracking error signal indicating a relative position between an information track and the light spot reference to a signal outputted from said optical disk, and
   a tracking control means for returning an output of said position sensing means back to said positioner in such a manner that the optical head pursues a desired track in response to the tracking error signal;
a speed control loop which comprises,
   a track count means for setting the number of tracks from the information track being pursued at present by the optical head to a desired information track and reducing the value every time the optical head traverses the information track,
   a reference velocity generating means for outputting a reference velocity while the reference velocity is being changed in response to a value of the track count means,
   a clock generating means for generating a reference clock for use in measuring a period in which a light spot traverses the information track,
   a period count means for measuring a period in which the light spot traverses in response to an output of said clock generating means,
   a period/velocity converting means for outputting a velocity signal corresponding to a velocity in which a light spot traverses the information track by dividing a predetermined period/velocity converting constant in response to an output of said period count means, and
   a velocity error sensing means for calculating a difference between said reference velocity generating means and said period/velocity converting means and returning the difference back to said positioner; and
a track pitch discriminator to determine a track pitch of the information track; wherein
   an access is carried out for a desired information track by switching from said speed control loop to said tracking control loop at a time the light spot reaches near the desired information track, and
   said period/velocity converting constant is changed in such a manner that a period/velocity converting constant C1 at a track pitch P1 and a period/velocity converting constant C2 at a track pitch P2 show a relation of C1/P1=C2/P2 in response to an output of said track pitch discriminator.

6. An access control apparatus as claimed in claim 5, wherein, information on the track pitch is previously recorded in a cartridge storing said optical disk, and said track pitch discriminator is so composed that the track pitch is determined by regenerating said information on the track pitch.

7. An access control apparatus comprising:

a tracking control loop which comprises,
   an optical head for recording or regenerating information by forming a light spot on an information track provided on an optical disk,
   a positioner to move said optical head in a radial direction of the optical disk and position set said optical head on a desired information track,
   a position sensing means for making a tracking error signal indicating a relative position between an information track and the light spot in reference to an output signal from said optical head, and
   a tracking control means for returning an output of said position sensing means back to said positioner in such a manner that said optical head pursues a desired track in response to the tracking error signal,
a speed control loop which comprises,
   a track count means for setting the number of tracks from the information track being pursued at present by the optical head to a desired information track and reducing the value every time the optical head traverses the information track,
   a reference velocity generating means for outputting a reference velocity while the reference velocity is being changed in response to a value of said track count means,
   a clock generating means for generating a reference clock for use in measuring a period in which a light spot traverses the information track,
   a period count means for measuring a period in which the light spot traverses in response to an output of said clock generating means,
   a period/velocity converting means for outputting a velocity signal corresponding to a velocity in which the light spot traverses the information track in response to an output of said period count means,
   an amplifying means for amplifying an output from said period/velocity converting means,
   a velocity error sensing means for calculating a difference between said reference velocity generating means and said amplifying means and returning it back to said positioner, and
a track pitch discriminator to determine a track pitch of the information track, wherein
   an access is carried out for a desired information track by switching from said speed control loop to said tracking control loop at a time the light spot reaches near the desired information track, and
   a degree of amplification of said amplifying means is changed in such a manner that a degree of amplification A1 of said amplifying means at a track pitch P1 and a degree of amplification A2 of said amplifying means at a track pitch P2 show a relation of A1/P1=A2/P2 in response to an output of said track pitch discriminator.

8. An access control apparatus as claimed in claim 7, wherein, information on the track pitch is previously recorded in a cartridge storing said optical disk, and said track pitch discriminator is so composed that the track pitch is determined by regenerating said information on the track pitch.

9. An access control apparatus comprising:

a tracking control loop which comprises, an optical head for recording or regenerating information by forming a light spot on an information track provided on an optical disk, a positioner to move said optical head in a radial direction of the optical disk and position set said optical head on a desired information track, a position sensing means for making a tracking error signal indicating a relative position between an information track and the light spot in reference to a signal outputted from said optical disk, and a tracking control means for returning an output of said position sensing means back to the positioner in such a manner that said optical head pursues a desired track in response to the tracking error signal, a speed control loop which comprises, a count means for setting the number of tracks from the information track being pursued at present by the optical head to a desired information track and reducing the value every time the optical head traverses the information track, a reference velocity generating means for outputting a reference velocity while the reference velocity is being changed in response to a value of the track count means, a velocity sensing means for outputting a velocity signal corresponding to a velocity in which a light spot traverses the information track by differentiating an output of said position sensing means, an amplifying means for amplifying an output from said velocity sensing means, a velocity error sensing means for calculating a difference between outputs of said reference velocity generating means and said amplifying means sensing means and returning the difference back to said positioner; and a track pitch discriminator means for discriminating a track pitch of said information track, wherein an access is carried out for a desired information track by switching from the speed control loop to said tracking control loop at a time the light spot reaches near the desired information track, and a degree of amplification of said amplifying means is changed in such a manner that a degree of amplification A1 of said amplifying means at a track pitch P1 and a degree of amplification A2 of said amplifying means at a track pitch P2 show a relation of A1/P1=A2/P2 in response to an output of said track pitch discriminator.

10. An access control apparatus as claimed in claim 9, wherein, information on the track pitch is previously recorded on a cartridge storing said optical disk, and said track pitch discriminator is so composed that the track pitch is determined by regenerating said information on the track pitch.

11. An access control apparatus comprising:

a tracking control loop which comprises, an optical head for recording or regenerating information by forming a light spot on an information track provided on an optical disk, a positioner to move said optical head in a radial direction of the optical disk and position set said optical head on a desired information track, a position sensing means for making a tracking error signal indicating a relative position between an information track and the light spot in reference to a signal outputted from the optical disk, and a tracking control means for returning an output of said position sensing means back to the positioner in such a manner that said optical head pursues a desired track in response to the tracking error signal, a speed control loop which comprises, a track count means for setting the number of tracks from the information track being pursued at present by the optical head to a desired information track and reducing the value every time the optical head traverses the information track, a multiplying means for multiplying a predetermined multiplying constant to an output from said track count means, a reference velocity generating means for outputting a reference velocity while the reference velocity is being changed in response to a value of the track count means, a clock generating means for generating a reference clock for measuring a period in which the light spot traverses the information track, a period count means for measuring a period in which the light spot traverses in response to an output of the clock generating means, a period/velocity converting means for outputting a velocity signal corresponding to a velocity in which the light spot traverses the information track in response to an output of said period count means, a velocity error sensing means for calculating a difference between said reference velocity generating means and said period/velocity converting means and returning the difference back to said positioner; and a track pitch discriminator for discriminating a track pitch of the information track, wherein an access is carried out for a desired information track by switching from said speed control loop to said tracking control loop at a time the light spot reaches near the desired information track, and wherein the multiplying constant of said multiplying means is changed in such a manner that a multiplying constant A1 at a track pitch P1 and a multiplying constant A2 at a track pitch P2 show a relation of A1/P1=A2/P2 in response to an output of said track pitch discriminator and a reference velocity is generated in response to an output of said multiplying means.

12. An access control apparatus as claimed in claim 11, wherein, information on the track pitch is previously recorded on a cartridge storing said optical disk, and said track pitch discriminator is so composed that the track pitch is determined by regenerating said information on the track pitch.

* * * * *

UNITED STATES PATENT AND TRADEMARK OFFICE
CERTIFICATE OF CORRECTION

PATENT NO. : 5,592,448
DATED : January 7, 1997
INVENTOR(S) : Motoyuki Suzuki, et al.

It is certified that error appears in the above-indentified patent and that said Letters Patent is hereby corrected as shown below:

Claim 8, column 15, line 20, delete "optical-head" and insert therefor  --optical head--.

Claim 9, column 17, line 42, delete "sensing means".

Claim 11, column 18, line 32, delete "of the clock" and insert therefor  --of said clock--.

Signed and Sealed this

Twenty-ninth Day of July, 1997

Attest:

BRUCE LEHMAN

*Attesting Officer*

*Commissioner of Patents and Trademarks*